US012048082B2

(12) United States Patent
Uno et al.

(10) Patent No.: US 12,048,082 B2
(45) Date of Patent: Jul. 23, 2024

(54) HIGH FREQUENCY HEATING APPARATUS

(71) Applicant: Panasonic Intellectual Property Management Co., Ltd., Osaka (JP)

(72) Inventors: Takashi Uno, Shiga (JP); Mikio Fukui, Shiga (JP); Koji Yoshino, Shiga (JP); Daisuke Hosokawa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 595 days.

(21) Appl. No.: 17/290,724

(22) PCT Filed: Nov. 20, 2019

(86) PCT No.: PCT/JP2019/045506
§ 371 (c)(1),
(2) Date: Apr. 30, 2021

(87) PCT Pub. No.: WO2020/110866
PCT Pub. Date: Jun. 4, 2020

(65) Prior Publication Data

US 2022/0007471 A1 Jan. 6, 2022

(30) Foreign Application Priority Data

Nov. 30, 2018 (JP) ................................ 2018-225566

(51) Int. Cl.
*H05B 6/54* (2006.01)
*H05B 6/50* (2006.01)
(Continued)

(52) U.S. Cl.
CPC ................ *H05B 6/54* (2013.01); *H05B 6/50* (2013.01); *H05B 6/664* (2013.01); *H05B 6/688* (2013.01)

(58) Field of Classification Search
CPC . H05B 6/50; H05B 6/54; H05B 6/664; H05B 6/688
(Continued)

(56) References Cited

U.S. PATENT DOCUMENTS 2,467,782 A * 4/1949 Schuman ................ H05B 6/50 333/17.1
2,546,004 A * 3/1951 Kinn ........................ H05B 6/78 333/100
(Continued)

FOREIGN PATENT DOCUMENTS

| | | |
|---|---|---|
| CN | 103523685 | 1/2014 |
| JP | 2006-012547 | 1/2006 |
| JP | 2006-111439 | 4/2006 |

OTHER PUBLICATIONS

English Translation of Chinese Search Report dated Jan. 20, 2023 in corresponding Chinese Patent Application No. 201980077774.5.
(Continued)

*Primary Examiner* — Quang T Van
(74) *Attorney, Agent, or Firm* — Wenderoth, Lind & Ponack, L.L.P.

(57) ABSTRACT

A high frequency heating apparatus of the present disclosure includes a first electrode (11), a second electrode (12), a high frequency power supply, a position adjuster (20), and a controller. The second electrode (12) is disposed facing the first electrode (11). The high frequency power supply supplies high frequency power to the first electrode (11) or the second electrode (12). The position adjuster (20) adjusts the position of the first electrode (11). The controller controls the position adjuster (20). The position adjuster (20) includes a weight (21), one or more connecting lines (22), one or more pulleys (23), and one or more drive units (24). The one or more connecting lines (22) connect the weight (21) and the first electrode (11). The one or more pulleys
(Continued)

(23) support the one or more connecting lines (22). The one or more drive units (24) are attached to the one or more pulleys (23) and drive the one or more pulleys (23). In this embodiment, a heating target can be heated efficiently.

10 Claims, 10 Drawing Sheets

(51) Int. Cl.
*H05B 6/66* (2006.01)
*H05B 6/68* (2006.01)

(58) Field of Classification Search
USPC ....... 219/702, 708, 709, 710, 716, 764, 770, 219/771, 777, 780
See application file for complete search history.

(56) References Cited

U.S. PATENT DOCUMENTS 10,950,418 B2 * 3/2021 Tateshita ........... H01J 37/32477
2013/0092662 A1 * 4/2013 Fukami ................ B23K 1/0004 219/78.01

OTHER PUBLICATIONS

International Search Report of PCT application No. PCT/JP2019/045506 dated Feb. 4, 2020.

* cited by examiner

HIGH FREQUENCY HEATING APPARATUS

TECHNICAL FIELD

The present disclosure relates to a high frequency heating apparatus.

BACKGROUND ART

Conventionally, a high frequency heating apparatus disclosed in Patent Literature 1, for example, is known. This apparatus is a defrosting apparatus that heats a heating target disposed between opposing electrodes with high frequency power supplied across the electrodes.

The defrosting apparatus disclosed in Patent Literature 1 is furnished with opposing electrodes, an electrode gap adjusting mechanism, a high frequency supplying circuit, and a condition-changing section. The electrode gap adjusting mechanism adjusts the gap between the opposing electrodes. The high frequency supplying circuit supplies high frequency power to the opposing electrodes. The condition-changing section changes a supply condition of the high frequency power to the opposing electrodes based on the gap between the opposing electrodes.

The defrosting apparatus disclosed in Patent Literature 1 adjusts the gap between the opposing electrodes according to the height of a target object to be defrosted, so that the target object can be defrosted in a more appropriate condition regardless of the height of the target object.

CITATION LIST

Patent Literature

PTL 1: Japanese Patent Unexamined Publication No. 2006-12547

SUMMARY

The apparatus disclosed in Patent Literature 1 includes an elevating mechanism including a motor and a rod-shaped support member. The elevating mechanism elevates and lowers an electrode, which is supported by a support member connected to a rack of a rack-and-pinion mechanism connected to the motor.

The apparatus of such type moves the electrode by rotation of the motor while supporting the electrode with the support member. For this reason, it is necessary to use a large-sized motor with a high torque, or to use gears in order to produce a high torque. However, it is difficult to control the vertical movements of the support member using the motor so that the electrode can be placed at an appropriate position according to the height of the heating target.

If the electrode is cannot be placed at an appropriate position, the heating target may not be heated uniformly, or it may take a long time to complete the heating. As a consequence, the heating target cannot be heated efficiently.

Moreover, the apparatus of such type requires a certain space for placing the motor and the support member. In other words, there is also room for improvement in the apparatus of such type from the viewpoint of space saving.

A high frequency heating apparatus according to an embodiment of the present disclosure includes a first electrode, a second electrode, a high frequency power supply, a position adjuster, and a controller. The second electrode is disposed facing the first electrode. The high frequency power supply supplies a high frequency power to the first electrode or the second electrode. The position adjuster adjusts the position of the first electrode. The controller controls the position adjuster.

The position adjuster includes a weight, one or more connecting lines, one or more pulleys, and one or more drive units. The one or more connecting lines connect the weight and the first electrode. The one or more pulleys each support a corresponding one of the one or more connecting lines. The one or more drive units each are attached to a corresponding pulley of the one or more pulleys, and drive the corresponding pulley.

In this embodiment, a heating target can be heated efficiently.

DESCRIPTION OF EMBODIMENTS

Figure 1:
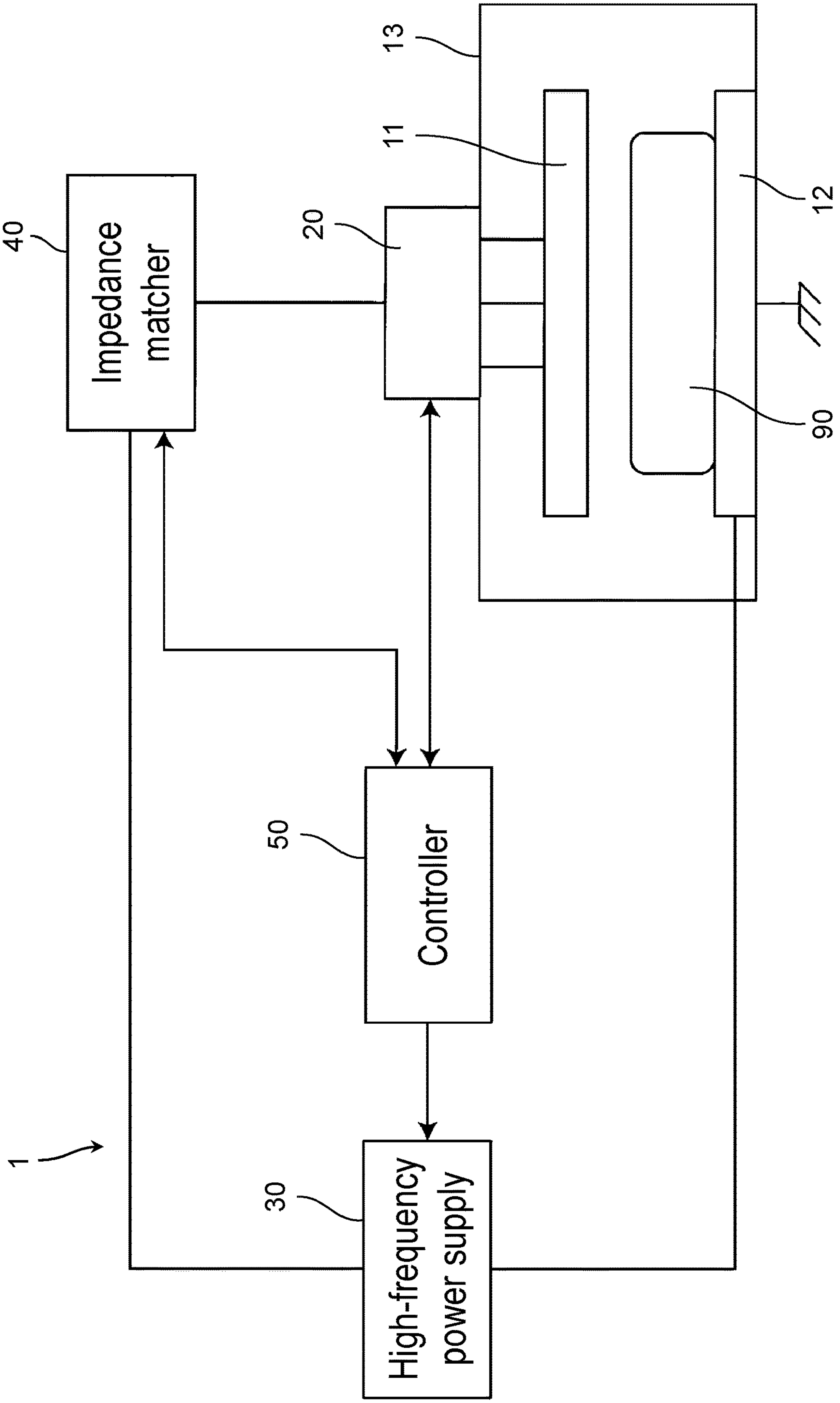
FIG. 1 is a schematic view illustrating the configuration of a high frequency heating apparatus according to an exemplary embodiment of the present disclosure.

A high frequency heating apparatus according to a first aspect of the present disclosure includes a first electrode, a second electrode, a high frequency power supply, a position adjuster, and a controller. The second electrode is disposed facing the first electrode. The high frequency power supply supplies a high frequency power to the first electrode or the second electrode. The position adjuster adjusts the position of the first electrode. The controller controls the position adjuster.

The position adjuster includes a weight, one or more connecting lines, one or more pulleys, and one or more drive units. The one or more connecting lines connect the weight to the first electrode. The one or more pulleys each support a corresponding one of the one or more connecting lines.

The one or more drive units each are attached to a corresponding pulley of the one or more pulleys, and drive the corresponding pulley.

In a high frequency heating apparatus according to a second aspect of the present disclosure, in addition to the first aspect, the weight is lighter in weight than the first electrode.

A high frequency heating apparatus according to a third aspect of the present disclosure is provided with, in addition to the first aspect, a power feeder that is disposed at a center of the first electrode and supplies a high frequency power from the high frequency power supply to the first electrode. The one or more connecting lines are connected to the first electrode at positions different from the power feeder.

A high frequency heating apparatus according to a fourth aspect of the present disclosure is further provided with, in addition to the first aspect, a guide that guides the first electrode in a height direction.

In a high frequency heating apparatus according to a fifth aspect of the present disclosure, in addition to the fourth aspect, the first electrode is supported by the guide.

In a high frequency heating apparatus according to a sixth aspect of the present disclosure, in addition to the fifth aspect, the one or more pulleys each are disposed closer to the guide than to a connecting position where a corresponding one of the one or more connecting lines and the first electrode are connected.

In a high frequency heating apparatus according to a seventh aspect of the present disclosure, in addition to the fifth aspect, the one or more connecting lines are connected to the first electrode so as to be inclined with respect to the first electrode.

In a high frequency heating apparatus according to an eighth aspect of the present disclosure, in addition to the first aspect, the one or more connecting lines are connected to the first electrode at a center of gravity of the first electrode. The one or more pulleys are disposed above the center of gravity of the first electrode so that the one or more connecting lines are perpendicular to the first electrode.

In a high frequency heating apparatus according to a ninth aspect of the present disclosure, in addition to the first aspect, the first electrode is connected to a plurality of connecting lines. The center of gravity of the first electrode is disposed at a center of gravity of a line segment that is formed by connecting a plurality of connecting positions where the plurality of connecting lines are connected to the first electrode, or a center of gravity of a polygon that is formed by connecting the plurality of connecting positions.

In a high frequency heating apparatus according to a tenth aspect of the present disclosure, in addition to the first aspect, each of the one or more connecting lines includes a plurality of line-shaped members that are independent from each other. The plurality of line-shaped members are connected to each other via the one or more pulleys.

In a high frequency heating apparatus according to an eleventh aspect of the present disclosure, in addition to the first aspect, the position adjuster further includes a weight guide that guides the weight in a height direction.

Hereafter, exemplary embodiments of the present disclosure will be described with reference to the appended drawings.

Overall Configuration

FIG. 1 is a schematic view illustrating the configuration of high frequency heating apparatus 1 according to an exemplary embodiment of the present disclosure. As illustrated in FIG. 1, high frequency heating apparatus 1 includes first electrode 11, second electrode 12, heating chamber 13, position adjuster 20, high frequency power supply 30, impedance matcher 40, and controller 50.

In the present exemplary embodiment, first electrode 11 and second electrode 12 are disposed in heating chamber 13. Heating target 90 is placed on second electrode 12 and between first electrode 11 and second electrode 12. Heating target 90 is a dielectric material, such as a food, with a uniform thickness.

Position adjuster 20 adjusts the position of first electrode 11. In the present exemplary embodiment, position adjuster 20 adjusts the height of first electrode 11 according to the height of heating target 90. High frequency power supply 30 supplies high frequency power to first electrode 11. As a result, electric field is generated between first electrode 11 and second electrode 12 so as to dielectrically heat heating target 90, which is disposed between first electrode 11 and second electrode 12.

First Electrode

First electrode 11 is a flat-shaped electrode having a rectangular shape, which is disposed in an upper part of heating chamber 13.

Second Electrode

Second electrode 12 is a flat-shaped electrode having a rectangular shape. Second electrode 12 is disposed on a bottom surface of heating chamber 13 so as to face first electrode 11.

Position Adjuster

Figure 2:
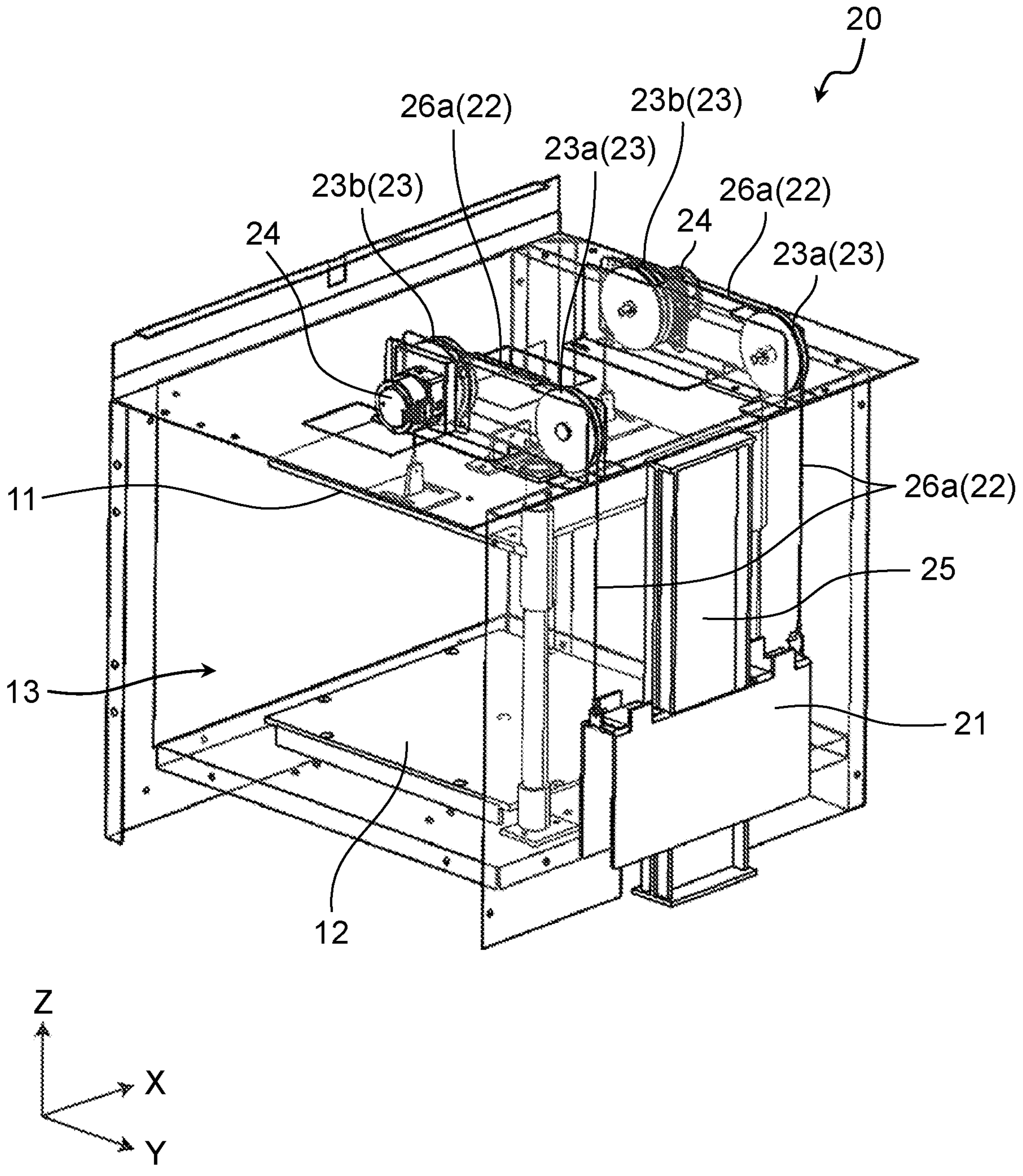
FIG. 2 is a perspective view illustrating an overall configuration of a position adjuster.
Figure 3:
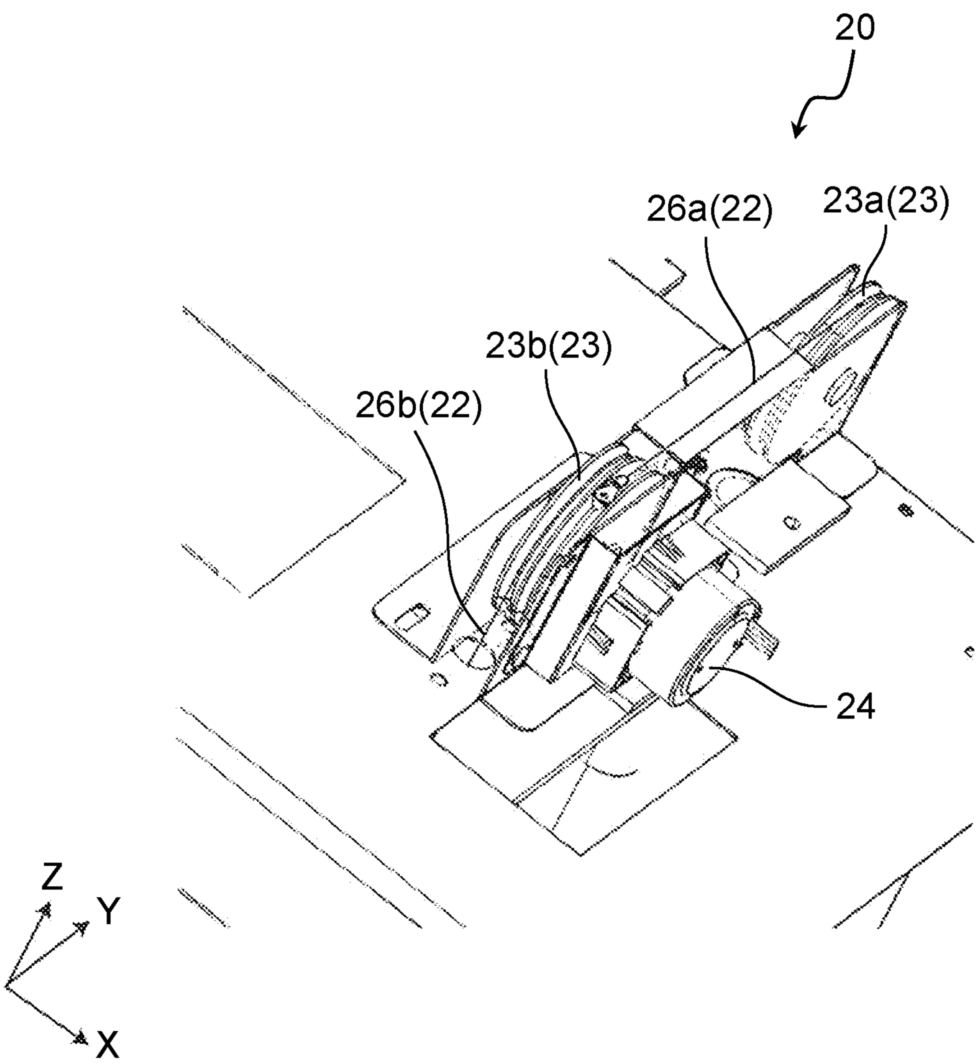
FIG. 3 is an enlarged perspective view illustrating a detailed configuration of the position adjuster.

FIG. 2 is a perspective view illustrating an overall configuration of position adjuster 20. FIG. 3 is an enlarged perspective view illustrating a detailed configuration of position adjuster 20. FIGS. 2 and 3 do not depict various components, such as high frequency power supply 30, impedance matcher 40, and controller 50, as well as the housing of high frequency heating apparatus 1, in order to clearly show the inside of heating chamber 13.

In the following drawings, X-axis, Y-axis, and Z-axis indicate a width direction, a depth direction, and a height direction of high frequency heating apparatus 1, respectively. The positive direction of the X-axis indicates the leftward direction of high frequency heating apparatus 1. The positive direction of the Y-axis indicates the rearward direction of high frequency heating apparatus 1. The positive direction of the Z-axis indicates the upward direction of high frequency heating apparatus 1.

As illustrated in FIG. 2, position adjuster 20 is disposed on a ceiling of heating chamber 13, and position adjuster 20 adjusts the distance between first electrode 11 and second electrode 12 in response to an instruction from controller 50. Position adjuster 20 includes weight 21, connecting lines 22, pulleys 23, and drive units 24. Weight 21 is disposed outside the rear wall of heating chamber 13. Weight 21 is connected to one end of each of connecting lines 22. Weight 21 is elevated and lowered by connecting lines 22, which are moved via pulleys 23.

Position adjuster 20 includes weight guide 25 that guides weight 21 in a height direction. Weight guide 25 is disposed outside the rear wall of heating chamber 13. Weight 21 is formed of a plate-shaped member having a rectangular shape. For example, weight 21 may be formed by bending a plate-shaped member. A hole through which weight guide 25 passes is formed at the center of weight 21. Weight 21 moves vertically along weight guide 25 in association with movement of connecting lines 22.

Weight 21 is lighter in weight than first electrode 11. For example, weight 21 may have a weight of 80% to 99%, inclusive, of the weight of first electrode 11.

Connecting line 22 connects weight 21 and first electrode 11 to each other. For example, connecting line 22 may be formed of a metal wire. One end of connecting line 22 is connected to weight 21. The other end of connecting line 22 is connected to first electrode 11. Connecting line 22 connect weight 21 and first electrode 11 to each other via pulley 23.

As illustrated in FIGS. 2 and 3, weight 21 and first electrode 11 are connected by two connecting lines 22. Each of connecting lines 22 includes line-shaped members 26*a* and 26*b*, which are independent from each other. One end of line-shaped member 26*a* is connected to weight 21, and the other end of line-shaped member 26*a* is connected to pulley 23*b*. One end of line-shaped member 26*b* is connected to first electrode 11, and the other end of line-shaped member 26*b* is connected to pulley 23*b*.

Pulley 23 is formed of a cylindrical member, and is rotatable about the central axis of the cylindrical member. A groove for guiding connecting line 22 is formed in a side surface of the cylindrical member of pulley 23. Pulley 23 includes two pulleys (pulleys 23*a* and 23*b*). Pulleys 23*a* and 23*b* are disposed outside the ceiling of heating chamber 13 so as to be arranged side by side, left and right.

Pulley 23*a* is disposed at a rearmost portion of the ceiling of heating chamber 13 and on the outside of the ceiling of heating chamber 13. Pulley 23*b* is disposed in front of pulley 23*a* and on the outside of the ceiling of heating chamber 13. For example, pulley 23*b* may be disposed above almost the center of first electrode 11. Pulley 23*a* is connected to line-shaped member 26*a* of connecting line 22. Pulley 23*b* is connected to line-shaped member 26*a* and line-shaped member 26*b* of connecting line 22.

Drive unit 24 is attached to a shaft of pulley 23*b* to rotate pulley 23*b*. For example, drive unit 24 may be composed of a stepping motor. As pulley 23 rotates, weight 21 moves vertically. When weight 21 is moved upward, first electrode 11 moves downward, and when weight 21 is moved downward first electrode 11 moves upward.

Drive unit 24 holds first electrode 11 at a predetermined position by a holding torque of a motor. The heaviness of weight 21 serves to reduce the holding torque of drive unit 24 that is necessary to hold first electrode 11.

Figure 4:
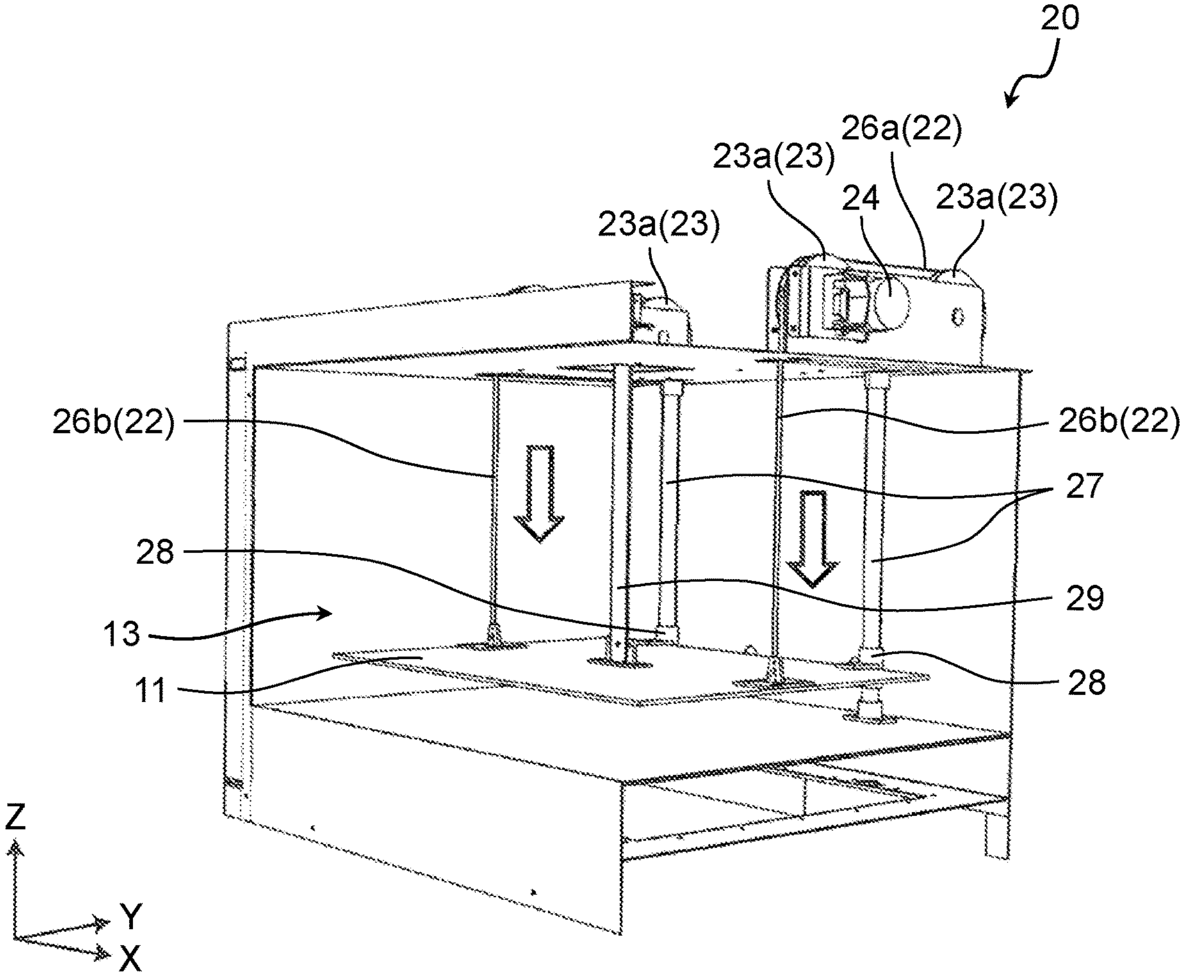
FIG. 4 is a perspective view illustrating the inside of a heating chamber, showing a state in which a first electrode has been moved downward.

FIG. 4 is a perspective view illustrating the inside of heating chamber 13, showing a state in which first electrode 11 has been moved downward. FIG. 4 does not depict some components such as high frequency power supply 30, impedance matcher 40, and controller 50, second electrode 12, as well as the housing of high frequency heating apparatus 1, in order to clearly show the inside of heating chamber 13.

As illustrated in FIG. 4, when drive unit 24 rotates pulley 23*b* so as to veer out line-shaped member 26*b* that has been wound around pulley 23*b*, first electrode 11 moves downward.

Two guides 27, each having a cylindrical shape whose central axis is along the Z-axis, are disposed inside heating chamber 13. Guides 27 are disposed near the rear wall of heating chamber 13. Guides 27 guide first electrode 11 vertically. Each of guide 27 may be formed of an insulating material, for example.

First electrode 11 is indirectly supported by guide 27 via tubular connecting member 28. Connecting member 28 is coupled to a rearward end of first electrode 11. Guide 27 is inserted through connecting member 28. When first electrode 11 moves vertically, connecting member 28 slides along guide 27.

In order to allow connecting member 28 to slide smoothly along guide 27, it is necessary to provide a slight gap between connecting member 28 and guide 27. Nevertheless, this gap may cause first electrode 11 to be tilted. In the present exemplary embodiment, first electrode 11 pushes connecting member 28 against guide 27 so that first electrode 11 can be kept horizontal, as will be described later in the following.

Power feeder 29, which supplies high frequency power supply 30 from high frequency power supply 30 to first electrode 11, is provided at the center of first electrode 11. Two connecting lines 22 are connected at leftward and rightward ends of first electrode 11 at the center along its forward and backward axis. Thus, two connecting lines 22 and power feeder 29 are lined up in a row along the side-to-side axis of high frequency heating apparatus 1.

Figure 5:
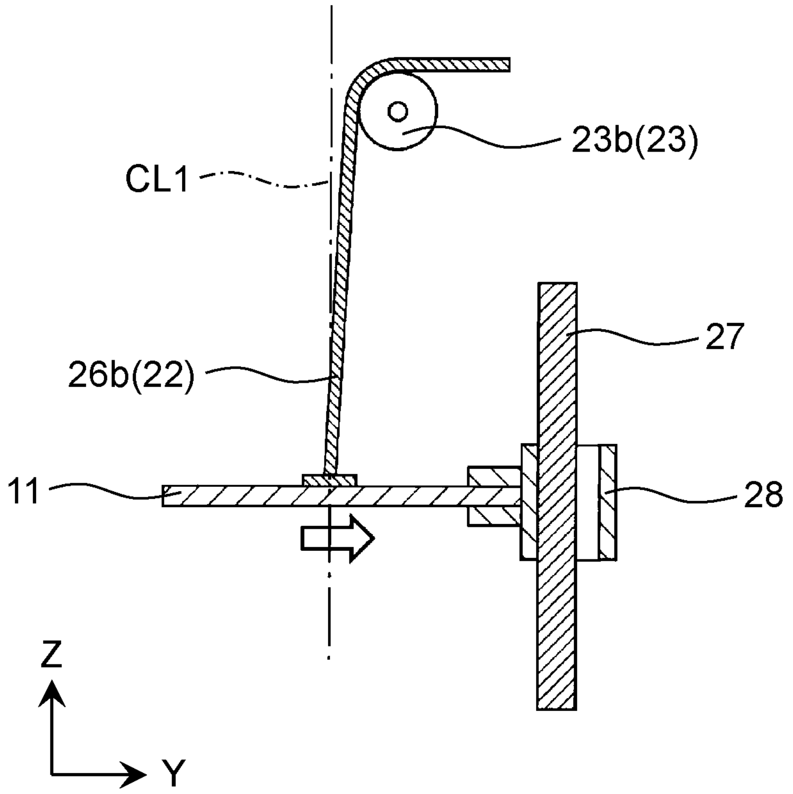
FIG. 5 is a cross-sectional view illustrating a connecting member pressed against a guide.

FIG. 5 is a cross-sectional view illustrating a state in which connecting member 28 is pressed against guide 27. FIG. 5 shows a condition of first electrode 11 when viewed along the side-to-side axis. As illustrated in FIG. 5, first electrode 11 presses connecting member 28 against guide 27. This allows connecting member 28 to be in parallel to guide 27. As a result, first electrode 11 is kept horizontal.

In the present exemplary embodiment, pulley 23*b* is disposed closer to guide 27 than center line CL1 shown in FIG. 5. Connecting line 22 is connected to first electrode 11 on center line CL1. This enables first electrode 11 to press connecting member 28 against guide 27. Center line CL1 refers to a line that extends vertically from the connecting position of connecting line 22 and first electrode 11, which passes through the center of the forward and backward axis of first electrode 11. In other words, pulley 23*b* is disposed closer to guide 27 than the connecting position of connecting line 22 and first electrode 11.

High Frequency Power Supply

Figure 6:
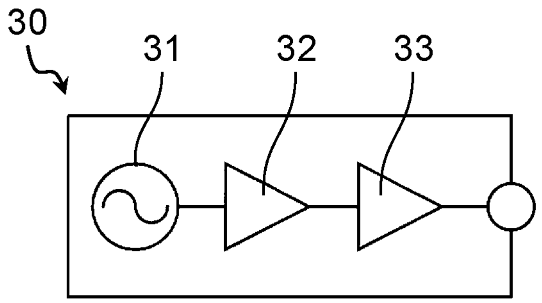
FIG. 6 is a schematic view illustrating a configuration of a high frequency power supply.

As described previously, high frequency power supply 30 is connected to first electrode 11 to supply high frequency power to first electrode 11. FIG. 6 is a schematic view illustrating a configuration of high frequency power supply 30. As illustrated in FIG. 6, high frequency power supply 30 includes high frequency oscillator 31, amplifier 32, and amplifier 33. High frequency oscillator 31 provides high frequency signal in a HF to VHF band. Amplifiers 32 and 33 amplify the high frequency signal provided by high frequency oscillator 31 in response to an instruction from controller 50.

Impedance Matcher

As illustrated in FIG. 1, impedance matcher 40 is disposed between first electrode 11 and high frequency power supply 30. Impedance matcher 40 matches the impedance of high frequency power supply 30 and the impedance inside heating chamber 13 including first electrode 11, second electrode 12, and heating target 90.

Figure 7A:
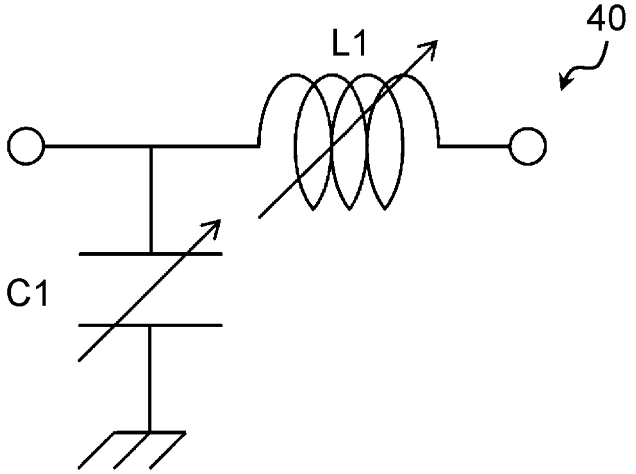
FIG. 7A is a schematic view illustrating a configuration of an impedance matcher.

FIG. 7A is a schematic view illustrating a configuration of impedance matcher 40. As illustrated in FIG. 7A, impedance matcher 40 includes variable inductor L1 and variable capacitor C1. As for impedance matcher 40, variable inductor L1 is connected to first electrode 11. Variable capacitor C1 is connected to ground. Accordingly, the capacitor formed by first electrode 11 and second electrode 12 is connected in series to variable inductor L1 and connected in parallel to variable capacitor C1.

Impedance matcher 40 performs impedance matching between heating chamber 13 and high frequency power supply 30 by varying one of the inductance of variable inductor L1 and the capacitance of variable capacitor C1 in response to an instruction from controller 50.

Figure 7B:
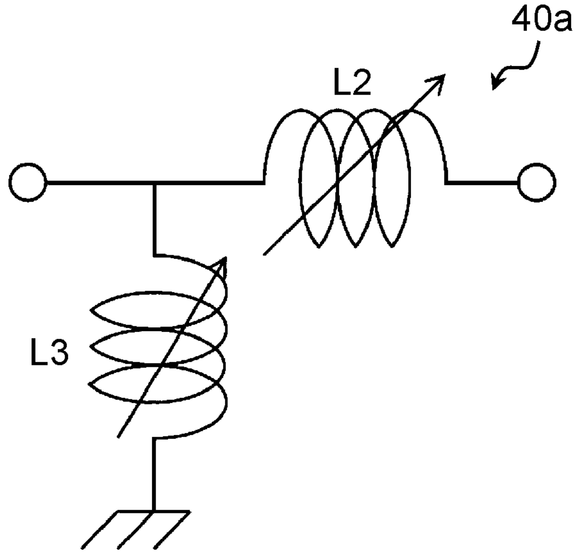
FIG. 7B is a schematic view illustrating another configuration of the impedance matcher.

FIG. 7B is a schematic view illustrating a configuration of impedance matcher 40*a*, which is a modified example of impedance matcher 40. As illustrated in FIG. 7B, impedance matcher 40*a* includes variable inductors L2 and L3. As for impedance matcher 40*a*, variable inductor L2 is connected to first electrode 11. Variable inductor L3 is connected to ground. Accordingly, the capacitor formed by first electrode 11 and second electrode 12 is connected in series to variable inductor L2 and connected in parallel to variable inductor L3. Impedance matcher 40*a* performs impedance matching between heating chamber 13 and high frequency power supply 30 by varying at least one of the inductances of variable inductors L2 and L3 in response to an instruction from controller 50.

Controller

Controller 50 may be composed of, for example, a microcomputer. As illustrated in FIG. 1, controller 50 causes position adjuster 20 to adjust the position (specifically, the height) of first electrode 11 according to the dimensions of heating target 90, which is placed between first electrode 11 and second electrode 12.

Controller 50 causes high frequency power supply 30 to supply a desired high frequency power to first electrode 11. Controller 50 causes impedance matcher 40 to perform impedance matching between heating chamber 13 and high frequency power supply 30. Specifically, controller 50 controls at least one of the inductance of a variable inductor contained in impedance matcher 40 and the capacitance of a variable capacitor contained in impedance matcher 40.

Advantageous Effects

The present exemplary embodiment makes it possible to provide the following advantageous effects.

High frequency heating apparatus 1 includes a position adjuster 20 that adjusts the position of first electrode 11. Position adjuster 20 includes weight 21, connecting line 22, pulley 23, and drive unit 24. Connecting line 22 connects weight 21 and first electrode 11 to each other. Pulley 23 supports connecting line 22. Drive unit 24 is attached to pulley 23 to drive pulley 23. This configuration makes it possible to adjust the position of first electrode 11 with high accuracy, and enables heating target 90 to be heated efficiently.

More specifically, the weight of weight 21 restrains the downward movement of first electrode 11, which is caused by the weight of first electrode 11, and thereby serves to reduce the torque of drive unit 24 that is necessary to stop or move first electrode 11. Therefore, controller 50 is able to adjust the position of first electrode 11 with high accuracy. As a result, controller 50 is able to place first electrode 11 at an appropriate position according to the dimensions of heating target 90.

The present exemplary embodiment enables heating target 90 to be heated uniformly, and allows the heating time to be reduced. As a result, heating target 90 can be heated efficiently.

In the present exemplary embodiment, the mechanism for moving first electrode 11 vertically is disposed outside heating chamber 13. For this reason, it is unnecessary to provide a space for placing this mechanism above first electrode 11 within heating chamber 13.

Pulley 23 changes the movement of connecting line 22 along the forward and backward axis to the movement of connecting line 22 along vertical axis. Pulley 23 also changes the movement of connecting line 22 along vertical axis to the movement of connecting line 22 along the forward and backward axis. For this reason, a space for accommodating connecting line 22, which moves along the forward and backward axis, does not need to be provided behind first electrode 11. The present exemplary embodiment allows the overall apparatus to be smaller, or allows heating chamber 13 to be wider.

The present exemplary embodiment is able to reduce the holding torque of drive unit 24 that is necessary to hold or move first electrode 11. Therefore, it is possible to use a small-sized motor with a low torque as drive unit 24. As a result, it is possible to achieve both space saving and cost reduction at the same time.

Weight 21 is lighter in weight than first electrode 11. This enables first electrode 11 to move downward easily when drive unit 24 stops the holding torque. As a result, it is possible to prevent idle running of pulley 23, for example.

High frequency heating apparatus 1 includes guide 27 that guides first electrode 11 vertically. This enables first electrode 11 to smoothly move vertically.

Power feeder 29, which supplies high frequency power supply 30 from high frequency power supply 30 to first electrode 11, is provided at the center of first electrode 11. A plurality of connecting lines 22 are connected to first electrode 11 at different positions from power feeder 29. This configuration enables a high frequency power to be supplied from the center of first electrode 11, and enables first electrode 11 to be held at a plurality of positions other than the center of first electrode 11. As a result, first electrode 11 can be held in a stable manner.

Connecting line 22 includes line-shaped members 26*a* and 26*b* that are independent from each other. Line-shaped members 26*a* and 26*b* are connected to each other via pulley 23. This configuration serves to prevent idle running of pulley 23.

Position adjuster 20 includes weight guide 25 that guides weight 21 vertically. This configuration allows weight 21 to move smoothly in the vertical direction.

The present exemplary embodiment illustrates that first electrode 11 has a rectangular shape. However, first electrode 11 may have other shapes, such as a circular shape, an elliptic shape, or a polygonal shape.

The present exemplary embodiment illustrates that, as illustrated in FIG. 6, high frequency power supply 30 includes high frequency oscillator 31 and amplifiers 32 and 33. However, high frequency power supply 30 is not limited to this configuration, as long as high frequency power supply 30 is able to output a high frequency power.

The present exemplary embodiment illustrates that high frequency heating apparatus 1 includes impedance matcher 40. However, high frequency heating apparatus 1 may not be provided with impedance matcher 40.

The present exemplary embodiment illustrates that weight 21 is disposed outside the rear wall of heating chamber 13. However, weight 21 may be disposed inside heating chamber 13, or on the outside of the ceiling of heating chamber 13.

The present exemplary embodiment illustrates that weight 21 is lighter in weight than first electrode 11. However, weight 21 may be heavier than first electrode 11. In this case, first electrode 11 can be moved upward more easily when drive unit 24 stops the holding torque.

In the present exemplary embodiment, position adjuster 20 includes one weight 21, which are connected to the plurality of connecting lines 22. However, position adjuster 20 may include a plurality of weights.

In the present exemplary embodiment, position adjuster 20 includes a plurality of connecting lines 22, a plurality of pulleys 23, and a plurality of drive units 24. However, it is also possible that position adjuster 20 may include one connecting line 22, one pulley 23, and one drive unit 24.

In the present exemplary embodiment, each of connecting lines 22 includes line-shaped members 26*a* and 26*b* that are independent from each other. However, connecting line 22 may be formed of one line-shaped member.

In the first exemplary embodiment, weight 21 and weight guide 25 are disposed outside the rear wall of heating chamber 13. However, weight 21 and weight guide 25 may be disposed either inside or outside heating chamber 13.

The present exemplary embodiment illustrates that position adjuster 20 includes weight guide 25. However, position adjuster 20 may not include weight guide 25.

The present exemplary embodiment illustrates that high frequency heating apparatus 1 includes guide 27 that guides first electrode 11 vertically. However, high frequency heating apparatus 1 may not be provided with guide 27.

The present exemplary embodiment illustrates that guide 27 is disposed inside heating chamber 13. However, guide 27 may be disposed outside heating chamber 13.

The present exemplary embodiment illustrates that first electrode 11 is indirectly supported by guide 27 via connecting member 28. However, first electrode 11 may be directly supported by guide 27. First electrode 11 may not be supported by guide 27 as long as first electrode 11 can be held horizontally.

The present exemplary embodiment illustrates that the plurality of connecting lines 22 are formed of metal wire. However, the material for connecting line 22 is not limited thereto as long as connecting line 22 can withstand the weight of first electrode 11. When the plurality of connecting lines 22 are composed of metal wires, it is desirable that first electrode 11 be insulated from the plurality of connecting lines 22.

In the present exemplary embodiment, pulley 23*b* is disposed closer to guide 27 than center line CL1 of first electrode 11. Connecting line 22 is connected to first electrode 11 on center line CL1. This enables first electrode 11 to press connecting member 28 against guide 27. However, the present disclosure is not limited to this configuration.

Figure 8A:
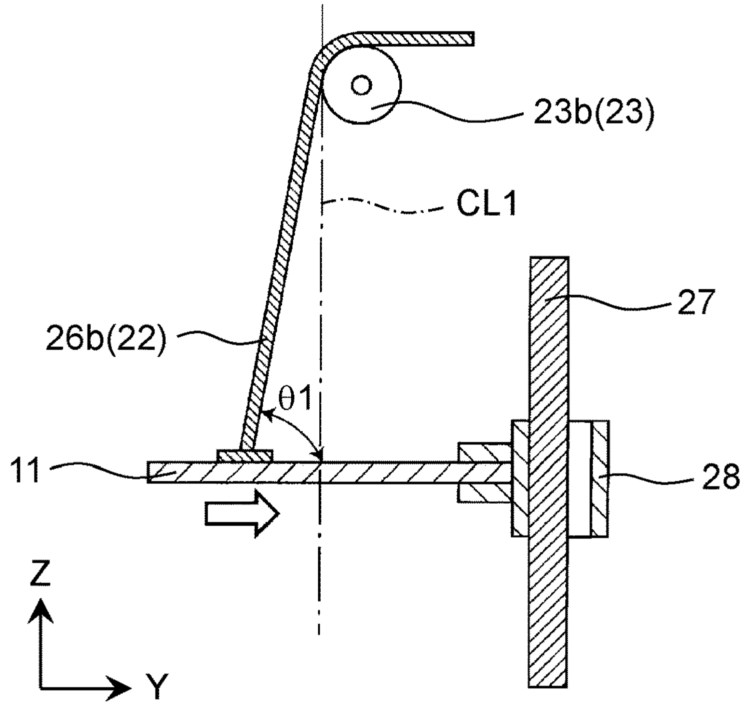
FIG. 8A is a cross-sectional view schematically illustrating a first modified example concerning a positional arrangement of a connecting line and a pulley.

FIG. 8A is a cross-sectional view schematically illustrating a first modified example concerning a positional arrangement of connecting line 22 and pulley 23. As illustrated in FIG. 8A, pulley 23*b* is disposed slightly closer to guide 27 than center line CL1 of first electrode 11. Connecting line 22 is connected to first electrode 11 at an opposite position to guide 27 relative to center line CL1 so that connecting line 22 is inclined at an angle of θ1 with respect to first electrode 11.

This configuration allows first electrode 11 to be biased in the positive direction along the Y-axis so as to cause connecting member 28 to be pressed against guide 27 in the positive direction along the Y-axis. Thus, the inner wall of connecting member 28 comes into contact with guide 27. As a result, connecting member 28 is brought parallel to guide 27, so that first electrode 11 is kept horizontal. Angle θ1 is an angle greater than 0° and less than 90° that is formed by first electrode 11 and connecting line 22.

Figure 8B:
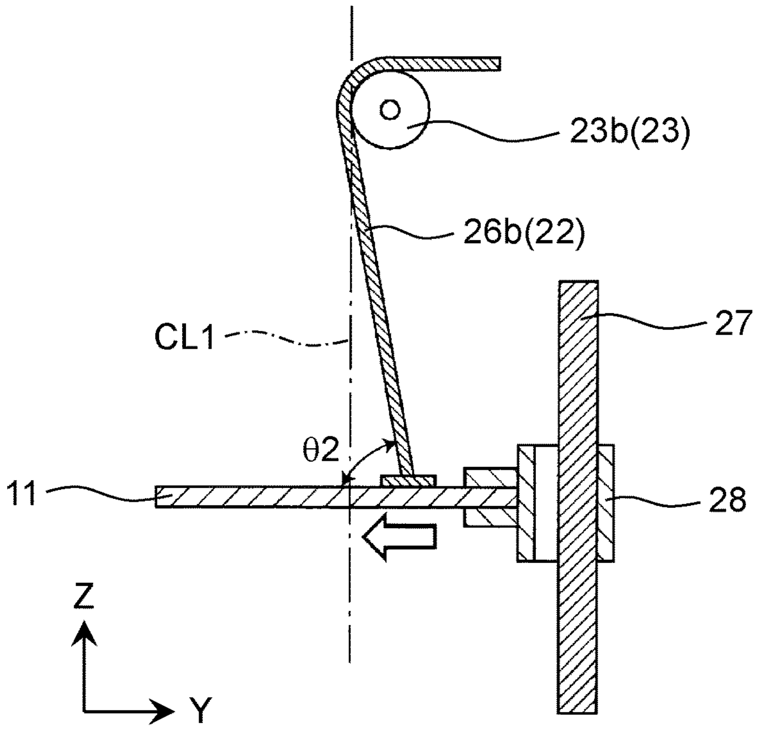
FIG. 8B is a cross-sectional view schematically illustrating a second modified example concerning the positional arrangement of the connecting line and the pulley.

FIG. 8B is a cross-sectional view schematically illustrating a second modified example concerning the positional arrangement of connecting line 22 and pulley 23. As illustrated in FIG. 8B, pulley 23*b* is disposed slightly closer to guide 27 than center line CL1 of first electrode 11. Connecting line 22 is connected to first electrode 11 at a position closer to guide 27 relative to center line CL1 so that connecting line 22 is inclined at an angle of θ2 with respect to first electrode 11.

This configuration allows first electrode 11 to be biased in the negative direction along the Y-axis so as to cause connecting member 28 to be pressed against guide 27 in the negative direction along the Y-axis. Thus, the inner wall of connecting member 28 comes into contact with guide 27. As a result, connecting member 28 is brought parallel to guide 27, so that first electrode 11 is kept horizontal. Angle θ2 is an angle greater than 0° and less than 90° that is formed by first electrode 11 and connecting line 22.

Figure 8C:
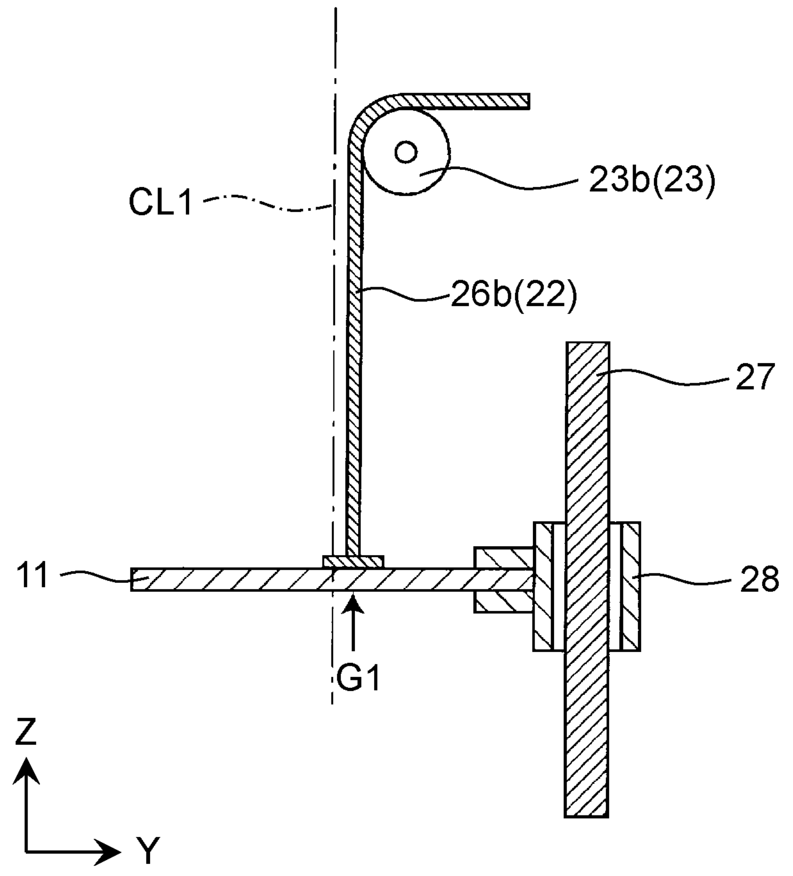
FIG. 8C is cross-sectional view schematically illustrating a third modified example concerning the positional arrangement of the connecting line and the pulley.

FIG. 8C is cross-sectional view schematically illustrating a third modified example concerning the positional arrangement of connecting line 22 and pulley 23. As illustrated in FIG. 8C, connecting line 22 is connected to the center of gravity G1 of first electrode 11. Pulley 23 is disposed above the center of gravity G1 of first electrode 11 so that connecting line 22 is perpendicular to first electrode 11. This allows first electrode 11 to be kept horizontal even when first electrode 11 is not in contact with guide 27.

In the example shown in FIG. 8C, the center of gravity G1 is positioned closer to guide 27 than center line CL1 of first electrode 11. However, the position of center line CL1 is not important as long as connecting line 22 is connected to the center of gravity G1 of first electrode 11.

Figure 9:
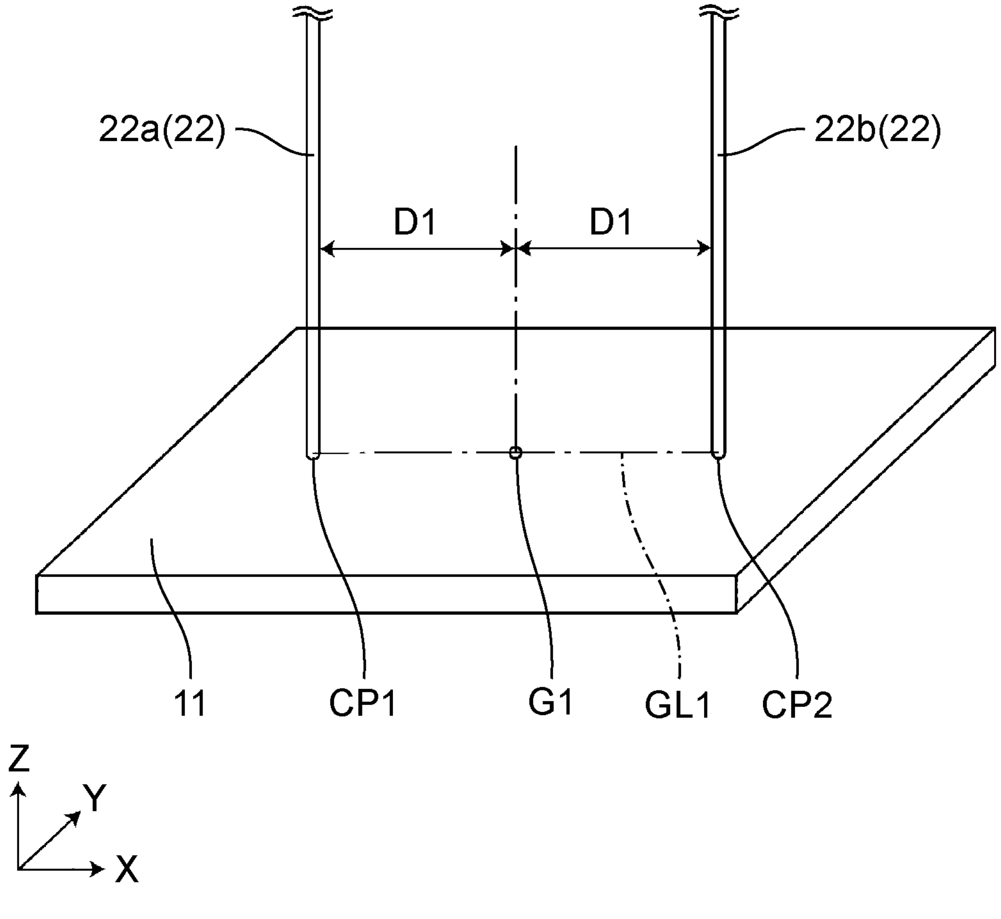
FIG. 9 is a perspective view schematically illustrating an example of the configuration for supporting the first electrode using two connecting lines.

FIG. 9 is a perspective view schematically illustrating an example of the configuration for supporting first electrode 11 using two connecting lines 22 (connecting line 22*a* and connecting line 22*b*). As illustrated in FIG. 9, connecting lines 22*a* and 22*b* are connected to first electrode 11 at connecting position CP1 and connecting position CP2, respectively, to support first electrode 11.

In this case, both the line segment connecting the center of gravity G1 and connecting position CP1 and the line segment connecting the center of gravity G1 and connecting position CP2 have a length D1. In other words, the center of gravity G1 of first electrode 11 is in agreement with the center of gravity of line segment GL1 that connects connecting position CP1 and connecting position CP2.

Figure 10:
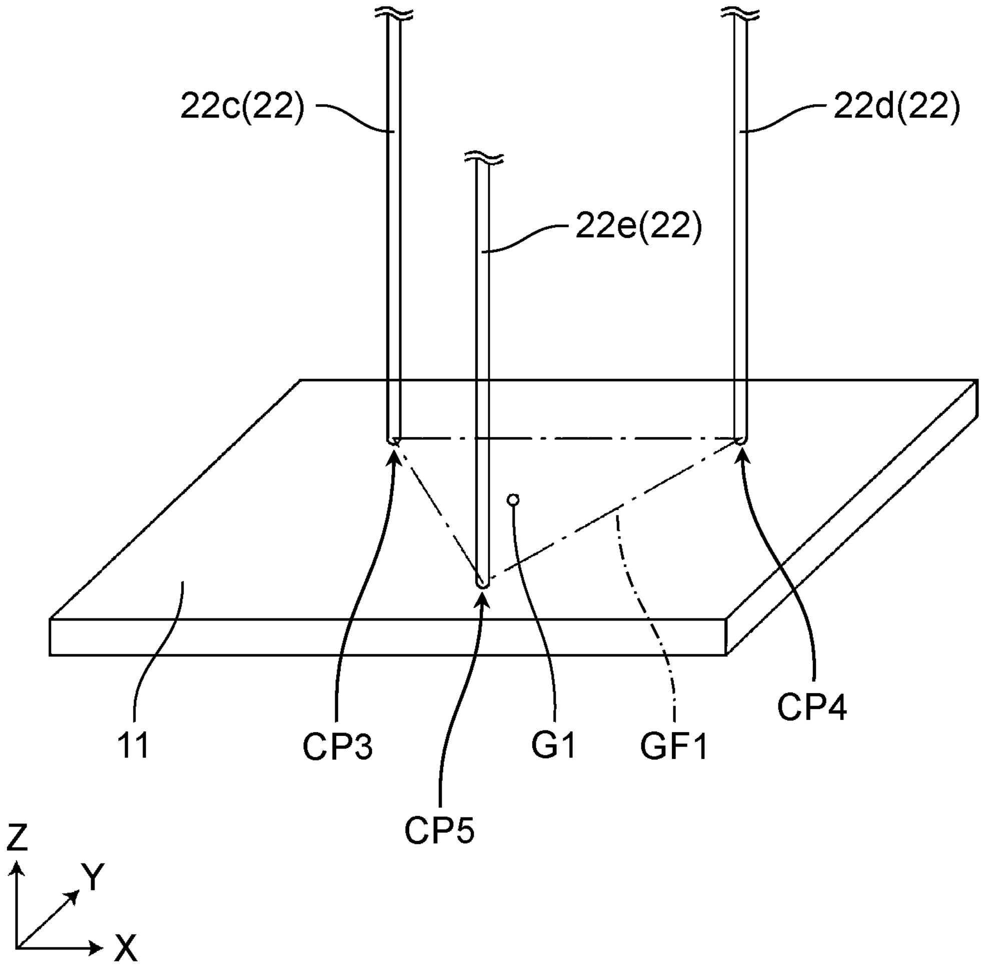
FIG. 10 is a perspective view schematically illustrating an example of the configuration for supporting the first electrode using three connecting lines.

FIG. 10 is a perspective view schematically illustrating an example of the configuration for supporting first electrode 11 using three connecting lines 22 (connecting line 22*c*, connecting line 22*d*, and connecting line 22*e*). As illustrated in FIG. 10, connecting lines 22*c*, 22*d*, and 22*e* are connected to first electrode 11 at connecting position CP3, connecting position CP4, and connecting position CP5, respectively, to support first electrode 11.

In this case, the center of gravity G1 of first electrode 11 is in agreement with the center of gravity of triangle GF1, which is formed by connecting connecting positions CP3, CP4, and CP5.

In the examples shown in FIGS. 9 and 10, first electrode 11 is supported by two connecting lines 22 or three connecting lines 22, respectively. However, it is also possible that first electrode 11 may be supported by four or more connecting lines 22. When this is the case, the center of gravity G1 of first electrode 11 may be in agreement with the center of gravity of a polygon that is formed by connecting the four or more connecting positions where the four or more connecting lines 22 are connected to first electrode 11.

INDUSTRIAL APPLICABILITY

The high frequency heating apparatus according to the present disclosure is applicable to, for example, cooking appliances, such as defrosters.

REFERENCE MARKS IN THE DRAWINGS

1 high frequency heating apparatus
11 first electrode

12 second electrode
13 heating chamber
20 position adjuster
21 weight
22, 22*a*, 22*b*, 22*c*, 22*d*, 22*e* connecting line
23, 23*a*, 23*b* pulley
24 drive unit
25 weight guide
26*a*, 26*b* line-shaped member
30 high frequency power supply
31 high frequency oscillator
32, 33 amplifier
40, 40*a* impedance matcher
50 controller
90 heating target

The invention claimed is:

1. A high frequency heating apparatus comprising:
a first electrode;
a second electrode disposed facing the first electrode;
a high frequency power supply configured to supply a high frequency power to the first electrode or the second electrode;
a position adjuster configured to adjust a position of the first electrode;
a controller configured to control the position adjuster; and
a power feeder disposed at a center of the first electrode, the power feeder configured to supply the high frequency power to the first electrode, wherein:
the position adjuster includes:
a weight;
one or more connecting lines connecting the weight to the first electrode;
one or more pulleys each supporting a corresponding one of the one or more connecting lines; and
one or more drive units each attached to a corresponding pulley of the one or more pulleys and configured to drive the corresponding pulley, and
the one or more connecting lines are connected to the first electrode at positions different from the power feeder.

2. The high frequency heating apparatus according to claim 1, wherein the weight is lighter in weight than the first electrode.

3. The high frequency heating apparatus according to claim 1, further comprising a guide configured to guide the first electrode in a height direction.

4. The high frequency heating apparatus according to claim 3, wherein the first electrode is supported by the guide.

5. The high frequency heating apparatus according to claim 4, wherein the one or more pulleys each are disposed closer to the guide than to a connecting position where a corresponding one of the one or more connecting lines and the first electrode are connected.

6. The high frequency heating apparatus according to claim 4, wherein the one or more connecting lines are connected to the first electrode so as to be inclined with respect to the first electrode.

7. The high frequency heating apparatus according to claim 1, wherein:
the one or more connecting lines includes a plurality of connecting lines; and
a center of gravity of the first electrode is disposed at a center of gravity of a line segment formed by connecting a plurality of connecting positions where the plurality of connecting lines are connected to the first electrode, or a center of gravity of a polygon formed by connecting the plurality of connecting positions.

8. The high frequency heating apparatus according to claim 1, wherein:
each of the one or more connecting lines includes a plurality of line-shaped members that are independent from each other; and
the plurality of line-shaped members are connected to each other via the one or more pulleys.

9. The high frequency heating apparatus according to claim 1, wherein the position adjuster further includes a weight guide guiding the weight in a height direction.

10. A high frequency heating apparatus comprising:
a first electrode;
a second electrode disposed facing the first electrode;
a high frequency power supply configured to supply a high frequency power to the first electrode or the second electrode;
a position adjuster configured to adjust a position of the first electrode; and
a controller configured to control the position adjuster, wherein:
the position adjuster includes:
a weight;
one or more connecting lines connecting the weight to the first electrode;
one or more pulleys each supporting a corresponding one of the one or more connecting lines; and
one or more drive units each attached to a corresponding pulley of the one or more pulleys and configured to drive the corresponding pulley, wherein:
the one or more connecting lines are connected to the first electrode at a center of gravity of the first electrode; and
the one or more pulleys are disposed above the center of gravity of the first electrode so that the one or more connecting lines are perpendicular to the first electrode.

* * * * *